US012677823B2

(12) United States Patent
Beaschler et al.

(10) Patent No.: US 12,677,823 B2
(45) Date of Patent: Jul. 14, 2026

(54) APPARATUS, SYSTEMS, AND METHODS TO MANAGE VEGETATION ALONG A RIGHT-OF-WAY

(71) Applicant: Marathon Petroleum Company LP, Findlay, OH (US)

(72) Inventors: Julia N. Beaschler, Findlay, OH (US); Scott W. Sharpe, Findlay, OH (US); Thomas Crosby, Houston, TX (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

(21) Appl. No.: 19/226,786

(22) Filed: Jun. 3, 2025

(65) Prior Publication Data

US 2025/0374912 A1    Dec. 11, 2025

Related U.S. Application Data

(60) Provisional application No. 63/733,207, filed on Dec. 12, 2024, provisional application No. 63/656,396, filed on Jun. 5, 2024.

(51) Int. Cl.
A01M 21/04          (2006.01)
G05D 1/248          (2024.01)
(Continued)

(52) U.S. Cl.
CPC ........... A01M 21/043 (2013.01); G05D 1/248 (2024.01); G05D 1/6445 (2024.01); G05D 1/65 (2024.01);
(Continued)

(58) Field of Classification Search
CPC .... A01M 21/043; A01M 21/00; G06V 20/17; G06V 20/176; G06V 20/188; G06V 20/56;
(Continued)

(56) References Cited

U.S. PATENT DOCUMENTS 2,995,307 A * 8/1961 Mcmahon ........... A01M 7/0053
                                                                      239/176
4,315,602 A * 2/1982 Kubacak ............... A01M 7/005
                                                                      239/587.5
(Continued)

FOREIGN PATENT DOCUMENTS

AU          2009202785 B2      1/2010
CA             3140426 A1 * 11/2020   ......... G05B 19/4155
(Continued)

OTHER PUBLICATIONS

Wiedemann et al., "Spray Boom for Sensing and Selectively Spraying Small Mesquite on Highway Rights-of-Way," Applied Engineering in Agriculture; vol. 18(6): 661-6666, 2002.

*Primary Examiner* — Monica L Perry
*Assistant Examiner* — Aaron M Rodziwicz
(74) *Attorney, Agent, or Firm* — Ray Quinney & Nebeker P.C.; Paul N. Taylor

(57)          ABSTRACT

Systems and methods for controlling vegetation growth along a right-of-way via a vehicle. In an embodiment, a method may include determining a portion of a right-of-way to traverse. The method may include determining a flow rate per vehicle speed threshold. The method may include initiating operation of the vehicle. The method may include during operation of the vehicle and as the vehicle traverses the portion of the right of way, determining a current speed of the vehicle and a current flow rate for an operating nozzle. The method may include, if the current speed of the vehicle and the current flow rate for the operating nozzle exceeds the flow rate per vehicle speed threshold, adjusting one or more of (a) the flow rate of the operating nozzle or (b) the current speed of the vehicle.

20 Claims, 8 Drawing Sheets

(51) Int. Cl.

| | |
|---|---|
| *G05D 1/644* | (2024.01) |
| *G05D 1/65* | (2024.01) |
| *G06V 20/10* | (2022.01) |
| *G06V 20/56* | (2022.01) |
| *G05D 107/20* | (2024.01) |
| *G05D 109/10* | (2024.01) |
| *G05D 111/10* | (2024.01) |

(52) U.S. Cl.
CPC ............ *G06V 20/188* (2022.01); *G06V 20/56* (2022.01); *G05D 2107/20* (2024.01); *G05D 2109/10* (2024.01); *G05D 2111/10* (2024.01)

(58) Field of Classification Search
CPC .......... G05D 2111/10; G05D 2109/10; G05D 2107/20; G05D 1/248; G05D 1/65; G06F 3/048
See application file for complete search history.

(56) References Cited

U.S. PATENT DOCUMENTS

| | | | |
|---|---|---|---|
| 4,784,324 A | 11/1988 | DeWitt et al. | |
| 5,826,370 A * | 10/1998 | Stevens ............... | A01M 7/0042 47/1.5 |
| 7,121,040 B2 * | 10/2006 | Wiese ................... | A01C 23/047 47/1.7 |

| | | | |
|---|---|---|---|
| 7,370,818 B2 * | 5/2008 | Ward .................... | E01H 10/007 239/662 |
| 9,497,956 B2 | 11/2016 | Dubose et al. | |
| 9,617,700 B2 * | 4/2017 | Eckman ................. | B05B 15/68 |
| 10,405,475 B2 | 9/2019 | Goda et al. | |
| 11,399,531 B1 * | 8/2022 | Sibley ................. | A01M 7/0089 |
| 11,789,453 B2 | 10/2023 | Chowdhary et al. | |
| 2001/0013517 A1 | 8/2001 | Hart et al. | |
| 2002/0185180 A1 | 12/2002 | Smith et al. | |
| 2004/0251313 A1 | 12/2004 | Burgess | |
| 2010/0175316 A1 | 7/2010 | Kubacak | |
| 2012/0153042 A1 | 6/2012 | Oedekoven et al. | |
| 2019/0362147 A1 * | 11/2019 | Adam ..................... | G06N 5/048 |
| 2022/0183208 A1 | 6/2022 | Sibley et al. | |
| 2022/0312757 A1 * | 10/2022 | Geiger ............... | G05B 19/4155 |
| 2022/0361475 A1 * | 11/2022 | Bachman ............. | G06T 7/0002 |
| 2025/0374909 A1 | 12/2025 | Beaschler et al. | |

FOREIGN PATENT DOCUMENTS

| | | | |
|---|---|---|---|
| CN | 220458389 U | 2/2024 | |
| EP | 2586304 A1 | 5/2013 | |
| GB | 2598881 A * | 3/2022 | ............. A01N 31/02 |
| RU | 217534 U1 | 4/2023 | |
| WO | 2010002274 A1 | 1/2010 | |
| WO | WO-2020232298 A1 * | 11/2020 | ......... G05B 19/4155 |
| WO | 2022269052 A1 | 12/2022 | |
| WO | 2023060350 A1 | 4/2023 | |

* cited by examiner

APPARATUS, SYSTEMS, AND METHODS TO MANAGE VEGETATION ALONG A RIGHT-OF-WAY

CROSS-REFERENCE TO RELATED APPLICATIONS

This application claims priority to and the benefit of U.S. Provisional Application No. 63/733,207, filed Dec. 12, 2024, titled "APPARATUS, SYSTEMS, AND METHODS TO MANAGE VEGETATION ALONG A RIGHT-OF-WAY". This application also claims priority to and the benefit of U.S. Provisional Application No. 63/656,396, filed Jun. 5, 2024, titled "APPARATUS, SYSTEMS, AND METHODS TO MANAGE VEGETATION ALONG A RIGHT-OF-WAY," the disclosures of which are incorporated herein by reference in their entireties.

FIELD OF DISCLOSURE

Embodiments of this disclosure relate to a spray apparatus that attaches to a utility vehicle (UTV) to manage vegetation along a right-of-way.

BACKGROUND

Pipeline is positioned throughout various environments worldwide to transport various fluids, such as hydrocarbons and/or renewable hydrocarbons, as well as water and/or other fluids, each in a liquid or gaseous state. For example, hundreds of thousands of miles of pipeline are positioned throughout the United States alone. A majority of such pipeline is buried or underground. Other buried or underground features are positioned worldwide as well, such as utility lines, sewage or septic lines or tanks, tunnels, and/or other various underground features.

Exposure of such pipeline, caused by erosion, weather events, unintentional interference (for example, digging along a right-of-way), and/or vegetation encroachment, may result in damage to or risk of damage to the pipeline or other underground features. A right-of-way has to remain clear of vegetation to ensure that such an exposure or a risk of exposure is detected and to ensure that the vegetation does not physically affect the underground feature.

One method to manage vegetation is by using all-terrain or utility vehicles (UTVs) with a sprayer. Such sprayers typically include pull-behind sprayers or hangover-bed boom sprayers. The use of such sprayers alters the center of balance of a UTV, thus increasing the chance that a UTV may flip or turn over on a right-of-way. Further, such sprayers offer limited adjustability, making the use of such sprayers impractical, as the types and amount of vegetation along the right-of-way can vary significantly.

SUMMARY

Accordingly, Applicant has recognized a need for a spray apparatus that attaches to a utility vehicle (UTV) to manage vegetation along a right-of-way. The present disclosure may address one or more of the above-referenced drawbacks or risks, as well as other possible drawbacks or risks.

The present disclosure is generally directed to embodiments of a spray apparatus to connect or attach to a UTV, as well as embodiments to install and utilize the spray apparatus on the UTV. In an embodiment, the spray apparatus may include various components to enable installation into a UTV. For example, the spray apparatus may include connectors to attach or connect to a selected area of a UTV bed. The connectors may then connect or attach to various supports such that the supports may move in horizontal and vertical direction. The spray apparatus may also include one or more nozzles. The one or more nozzles may be attached or connected to the ends of one of the supports. The nozzles may further include actuators to adjust the nozzles in a plurality of direction, such as horizontally, vertically, and/or angularly. In an embodiment, one actuator may adjust the spray pattern of the nozzle. In yet another embodiment, actuators may be attached or connected to each of the supports and configured to move the supports in a vertical or horizontal direction.

The spray apparatus may also include a tank and corresponding connectors to enable attachment or connection to the bed of the UTV. The spray apparatus may also include a pump and/or manifold, based on how many nozzles are included. The spray apparatus may include also include a wand and nozzle combination, enabling a user to manually to apply a treatment fluid (e.g., herbicide) to a selected area.

Additionally, the spray apparatus may include a controller, as well as one or more sensors or meters. For example, the tank may include a fill level sensor or meter. A flow meter may be positioned proximate the output of the pump, proximate the input of each nozzle, and/or at other varying locations. One or more sensors may determine vegetation height and density. The controller may also connect to or be in signal communication with each actuator to control nozzle and/or support position. Additionally, the controller may connect to or be in signal communication with a speedometer of the UTV. The controller may also connect to or be in signal communication with a user interface, the controller configured to display various aspects of the spray apparatus and/or alerts, as well as to display controls for manual operation of the spray apparatus.

Using the controller, the sensors, the meters, and/or other connections, the controller may determine when to adjust the nozzles and/or flow rate of herbicide for selected positions. For example, the controller may determine, based on a type and/or density of vegetation, a flow rate per UTV speed range or threshold. As the UTV traverses the right-of-way, the controller may continuously or substantially continuously determine whether the flow rate and/or speed moves outside of the flow rate per UTV speed range or threshold. If the range or threshold is exceeded, then the controller may adjust flow rate of the herbicide and/or prompt the UTV to decrease or increase in speed. The controller may also adjust spray pattern, flow rate, and/or nozzle position based on measured vegetation height and density.

The spray apparatus may be connected to the bed at such a position to ensure stability of the UTV and/or at such a position to prevent significant alteration to the center of balance of the UTV. Thus, the UTV can traverse steeper rights-of way without the potential for flipping or falling over.

Thus, the spray apparatus may be used to manage vegetation along a right-of-way for a variety and types of vegetation. Further, the spray apparatus may ensure that the UTV is balanced and stable. Further, the position of the spray apparatus may be such that the herbicide does not affect a user or driver of the UTV.

Accordingly, an embodiment of the disclosure is directed to a method to control vegetation growth along a right-of-way via a utility vehicle (UTV). The method may include determining a portion of a right-of-way to traverse. The method may include determining a flow rate per UTV speed threshold. The method may include initiating operation of the UTV, the UTV including a tank in fluid communication with a pump, the pump connected to a first end of a first hose and to cause herbicide to flow therethrough to an adjustable first nozzle connected to a second end of the first hose to thereby cause herbicide to be expelled from the first nozzle in one of a plurality of types of spray patterns, the first nozzle and at least a portion of the first hose supported by a vertically, horizontally, and/or automatically adjustable support structure, the support structure including a nozzle connecter, a horizontal support, and a vertical support, the horizontal support connected to the vertical support such that the horizontal support moves horizontally in relation to the vertical support and the vertical support connected to a bed of the UTV such that the vertical support moves vertically in relation to the bed of the UTV. The method may include during operation of the UTV and as the UTV traverses the portion of the right of way, determining a current speed of the UTV and a current flow rate for an operating nozzle. The method may include, if the current speed of the UTV and the current flow rate for the operating nozzle exceeds the flow rate per UTV speed threshold, adjusting one or more of (a) the flow rate of the operating nozzle or (b) the current speed of the UTV.

In another embodiment, the method may include, if the current speed of the UTV and the current flow rate for the operating nozzle exceeds the flow rate per UTV speed threshold, transmitting an alert to a cab section of the UTV, the alert including the adjusted speed of the UTV. The method may further include, if the current speed of the UTV and the current flow rate for the operating nozzle exceeds the flow rate per UTV speed threshold, transmitting an alert to a cab section of the UTV, the alert including the adjusted speed of the UTV.

In another embodiment, the method may include, during operation of the UTV, as the UTV traverses the portion of the right of way and in conjunction with determination of the current speed of the UTV and the current flow rate for an operating nozzle: (a) determining a density and height of vegetation for the portion of the right-of-way; and (b) if one or more of the density or height exceeds a first selected threshold range:

adjusting one or more of (a) a height of the first nozzle in relation to the bed of the UTV, (b) a horizontal location of the first nozzle in relation to the vertical support, (c) an angle of the first nozzle, or (d) a spray pattern of the first nozzle.

Another embodiment of the disclosure is directed to a method to control vegetation growth along a right-of-way via a utility vehicle (UTV). The method may include determining a portion of a right-of-way to traverse. The method may include initiating operation of the UTV, the UTV including a tank in fluid communication with a pump, the pump connected to a first end of a first hose and to cause herbicide to flow therethrough to an adjustable first nozzle connected to a second end of the first hose to thereby cause herbicide to be expelled from the first nozzle in one of a plurality of types of spray patterns, the first nozzle and at least a portion of the first hose supported by a vertically, horizontally, and/or automatically adjustable support structure, the support structure including a nozzle connecter, a horizontal support, and a vertical support, the horizontal support connected to the vertical support such that the horizontal support moves horizontally in relation to the vertical support and the vertical support connected to a bed of the UTV such that the vertical support moves vertically in relation to the bed of the UTV. The method may include during operation of the UTV and as the UTV traverses the portion of the right of way, determining a density and height of vegetation for the portion of the right-of-way. The method may, include if one or more of the density or height exceeds a first selected threshold range, adjusting one or more of (a) a height of the first nozzle in relation to the bed of the UTV, (b) a horizontal location of the first nozzle in relation to the vertical support, (c) an angle of the first nozzle, or (d) a spray pattern of the first nozzle.

In an embodiment, the method may include, during operation of the UTV and as the UTV traverses the portion of the right of way, determining a current speed of the UTV and a current flow rate for an operating nozzle. The method may include, if the current speed of the UTV and the current flow rate for the operating nozzle exceeds the flow rate per UTV speed threshold, adjusting one or more of (a) the flow rate of the operating nozzle or (b) the current speed of the UTV.

In another embodiment, the method may include determination of the density and height of vegetation for the portion of the right-of-way is based on one or more of visual inspection or data captured by one or more sensors. The one or more sensors may comprise image sensors positioned on the UTV, and wherein the data captured by one or more sensors comprises images captured by the one or more sensors.

In embodiments, the pump may be further connected to a first end of a second hose and to pump herbicide therethrough to an adjustable second nozzle and wand connected to the second end of the second hose to thereby cause the herbicide to be expelled from the second nozzle.

In another embodiment, the UTV may include a first end of a second hose and the pump to cause herbicide to flow therethrough to an adjustable second nozzle and wand connected to the second end of the second hose to thereby cause fluid to be expelled from the second nozzle.

In an embodiment, the method may include, if one or more of the density or height exceeds a second selected threshold range and if a slope exceeds a UTV slope threshold: (a) halting operation of the UTV; (b) de-activating the first nozzle; and (c) activating the second nozzle.

In another embodiment, the UTV includes a global positioning system. The UTV may traverse the portion of the right of way based on signals received via the GPS.

In another embodiment, adjustment of the one or more of (a) a height of the first nozzle in relation to the bed of the UTV, (b) a horizontal location of the first nozzle in relation to the vertical support, (c) an angle of the first nozzle, or (d) a spray pattern of the first nozzle occurs automatically via one or more control devices. The control devices may include an actuator, such as a servo motor or a stepper motor.

Another embodiment of the disclosure is directed to an apparatus to attach to a utility vehicle (UTV) to control vegetation along a right-of-way. The apparatus may include a vertical support comprising a first end and a second end, the second end to connect to a bed of the UTV so that the vertical support moves between a plurality vertical positions in relation to the bed of the UTV. The apparatus may include a horizontal support comprising a first end and a second end, the horizontal support to connect to the vertical support such that the horizontal support moves horizontally in relation to the vertical support. The apparatus may include a tank positionable within the bed. The apparatus may include a pump positionable within the bed and to fluidly connect to the tank. The apparatus may include a first hose comprising a first end and a second end, the first end of the first hose to connect to the pump, and partially positioned along the horizontal support. The apparatus may include a first nozzle to connect to the second end of the first hose and to one of the first end or the second end of the horizontal support such that, during a spraying operation, the first nozzle sprays herbicide behind the UTV and one or more of to a side portion or middle of the right-of-way. The apparatus may include a controller connected to the pump and the nozzle. The controller may be configured to, in response to a determination that one or more of the density and height of the vegetation exceeds a first threshold, determine an adjustment one or more of the vertical support or horizontal support. The controller may be configured to, in response to a determination that a current speed of the UTV and a current flow rate for the operating nozzle exceeds the flow rate per UTV speed threshold, adjust one or more of (a) the flow rate of the operating nozzle or (b) the current speed of the UTV.

In an embodiment, the apparatus may include one or more sensors to measure the density and height of the right-of-way. The controller may base the determination that the density and height of the vegetation exceeds the first selected threshold on measurements provided by the one or more sensors.

In an embodiment, the controller may base the determination that the density and height of the vegetation exceeds the first selected threshold on user input, and wherein the user input is based on a user's visual inspection of the right-of-way.

In another embodiment, the controller may further adjust one or more of a spray angle or spray pattern based on one or more of (a) the determination that the density and height of the vegetation exceeds the first threshold or (b) the determination that the current speed of the UTV and the current flow rate for the operating nozzle exceeds the flow rate per UTV speed threshold.

In an embodiment, the apparatus may include one or more of a rotary actuator or a linear actuator in signal communication with the controller and connected to the first nozzle, the controller configured to adjust the angular and linear position of the first nozzle via the one or more of the rotary actuator or the linear actuator. The controller may be configured to adjust the spray pattern of the first nozzle via the one or more of the rotary actuator or the linear actuator.

In another embodiment, the apparatus may include a flow rate meter in signal communication with the controller and positioned along the first hose and to measure the flow rate of herbicide flowing through the first hose. The controller may be configured to set a selected flow rate for a selected section of right of way based on vegetation height and density via the pump. The determination that the current speed of the UTV and the current flow rate for the operating nozzle exceeds the flow rate per UTV speed threshold may be based on measurements from the flow rate meter and measurements from a speedometer of the UTV. The tank may comprise a selected weight and is positioned in the bed of the UTV at a selected location to provide balance. The tank may include ballast to provide stability to the UTV.

Another embodiment of the disclosure is directed to an apparatus to attach to a utility vehicle (UTV) to control vegetation along a right-of-way. The apparatus may include a vertical connector to connect to a bed of the UTV. The apparatus may include a vertical support (a) comprising a first end and a second end and (b) to connect to the vertical connector such that the vertical support moves vertically in relation to the bed of the UTV. The apparatus may include a horizontal connector to connect to the first end of the vertical support. The apparatus may include a horizontal support (a) comprising a first end and a second end and (b) to connect to the horizontal connector such that the horizontal support moves horizontally in relation to the vertical support. The apparatus may include a tank positionable within the bed. The apparatus may include a pump to fluidly connect to the tank. The apparatus may include a first hose (a) comprising a first end and a second end, (b) the first end of the first hose to connect to the pump, and (c) at least partially positioned along the horizontal support. The apparatus may include a first nozzle to connect to the second end of the first hose and to one of the first end or the second end of the horizontal support such that, during a spraying operation, the first nozzle sprays herbicide behind the UTV. The apparatus may include a second hose (a) comprising a first end and a second end, (b) the first end of the second hose to connect to the pump. The apparatus may include a second nozzle to connect to the second end of the second hose and positioned on a wand to enable manual use for spot treatment of dense vegetation. The apparatus may include a one or more sensors to measure vegetation density and height as the UTV traverses the right-of-way. The apparatus may include a controller connected to the one or more sensors, the horizontal connector, and the vertical connector. The controller may be configured to, in response to a determination that the density and height of the vegetation exceeds a first threshold and is less than a second threshold: (a) adjust one or more of the vertical support or horizontal support via the vertical connector or horizontal connector, respectively; and (b) in response to a determination that the density and height of the vegetation exceeds the second threshold, direct flow of herbicide from the first nozzle to the second nozzle.

In an embodiment, the controller may be configured to, in response to a determination that a current speed of the UTV and a current flow rate for the first nozzle or the second nozzle exceeds a flow rate per UTV speed threshold, adjust one or more of (a) the flow rate of the operating nozzle or (b) the current speed of the UTV.

Another embodiment of the disclosure is directed to a kit to provide a spray assembly for a UTV to control vegetation along a right-of-way. The kit may include a container. The kit may include a first connector positioned in the container and configured to connect to the bed of the UTV. The kit may include a vertical support bar positioned in the container, comprising a first end and a second end, and configured to connect to the first connector such that the vertical support bar moves vertically in relation to the bed of the UTV. The kit may include a second connector positioned in the container and configured to connect to the first end of the vertical support bar. The kit may include a horizontal support bar positioned in the container, comprising a first end and a second end, and configured to connect to the horizontal connector such that the horizontal support bar moves horizontally in relation to the vertical support bar. The kit may include a tank positioned in the container and configured to connect to the bed of the UTV. The kit may include a pump positioned in the container and configured to fluidly connect to the tank. The kit may include a hose positioned in the container, comprising a first end and a second end, the first end of the hose to connect to the pump, and positionable along the horizontal support bar. The kit may include a nozzle positioned in the container and configured to connect to the second end of the hose and to one of the first end or the second end of the horizontal support such that, during a spraying operation, the nozzle sprays herbicide behind the UTV.

In an embodiment, the kit may include one or more additional hoses positioned in the container. The kit may include one or more additional nozzles positioned in the container. The kit may include a wand positioned in the container to enable manual use of the spray assembly.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other implementations, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1A:
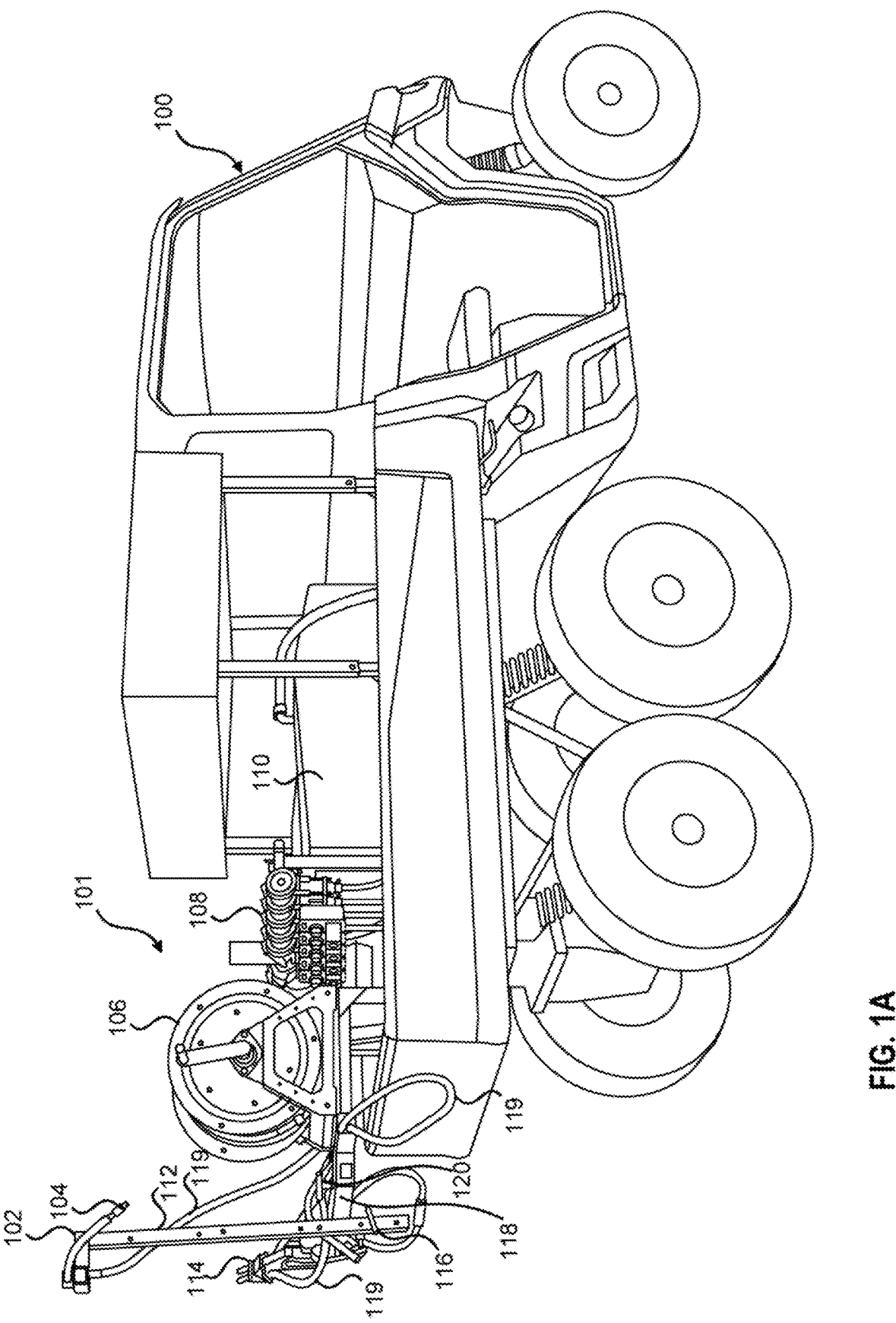
FIG. 1A, FIG. 1B, FIG. 1C, and FIG. 1D are diagrams illustrating a spray apparatus connected or attached to a utility vehicle (UTV), according to one or more embodiments of the disclosure.
Figure 1B:
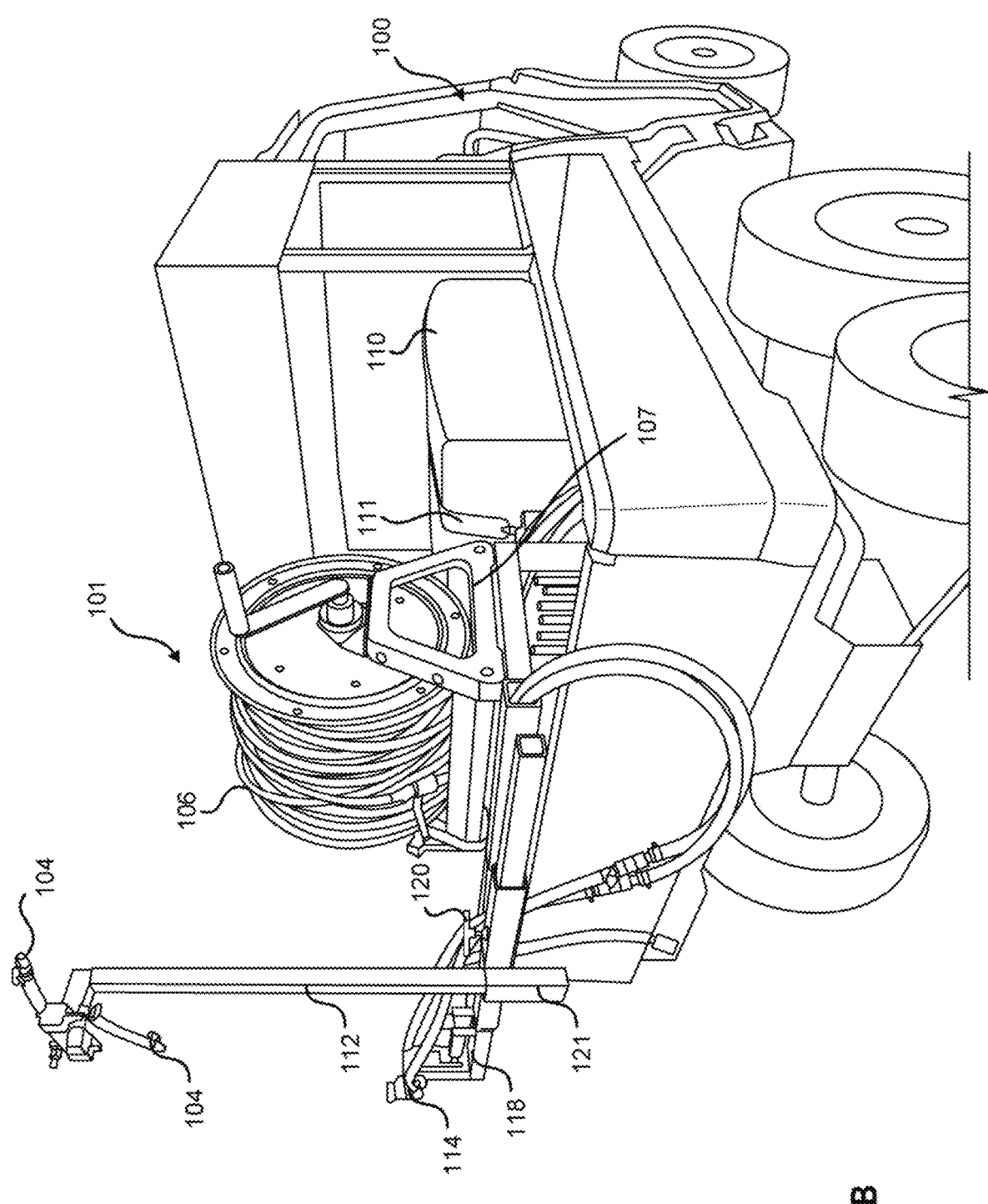
Figure 1C:
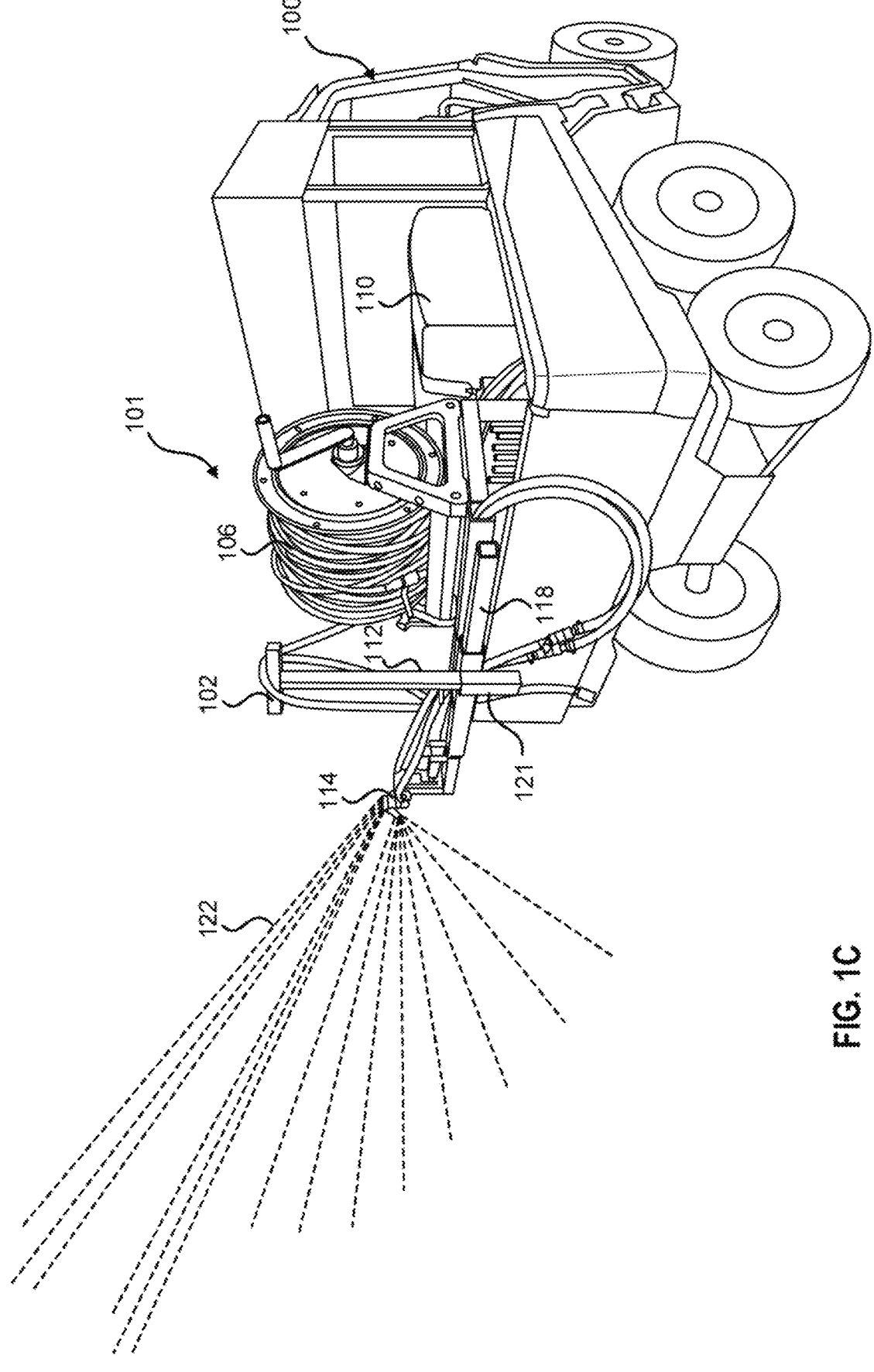
Figure 1D:
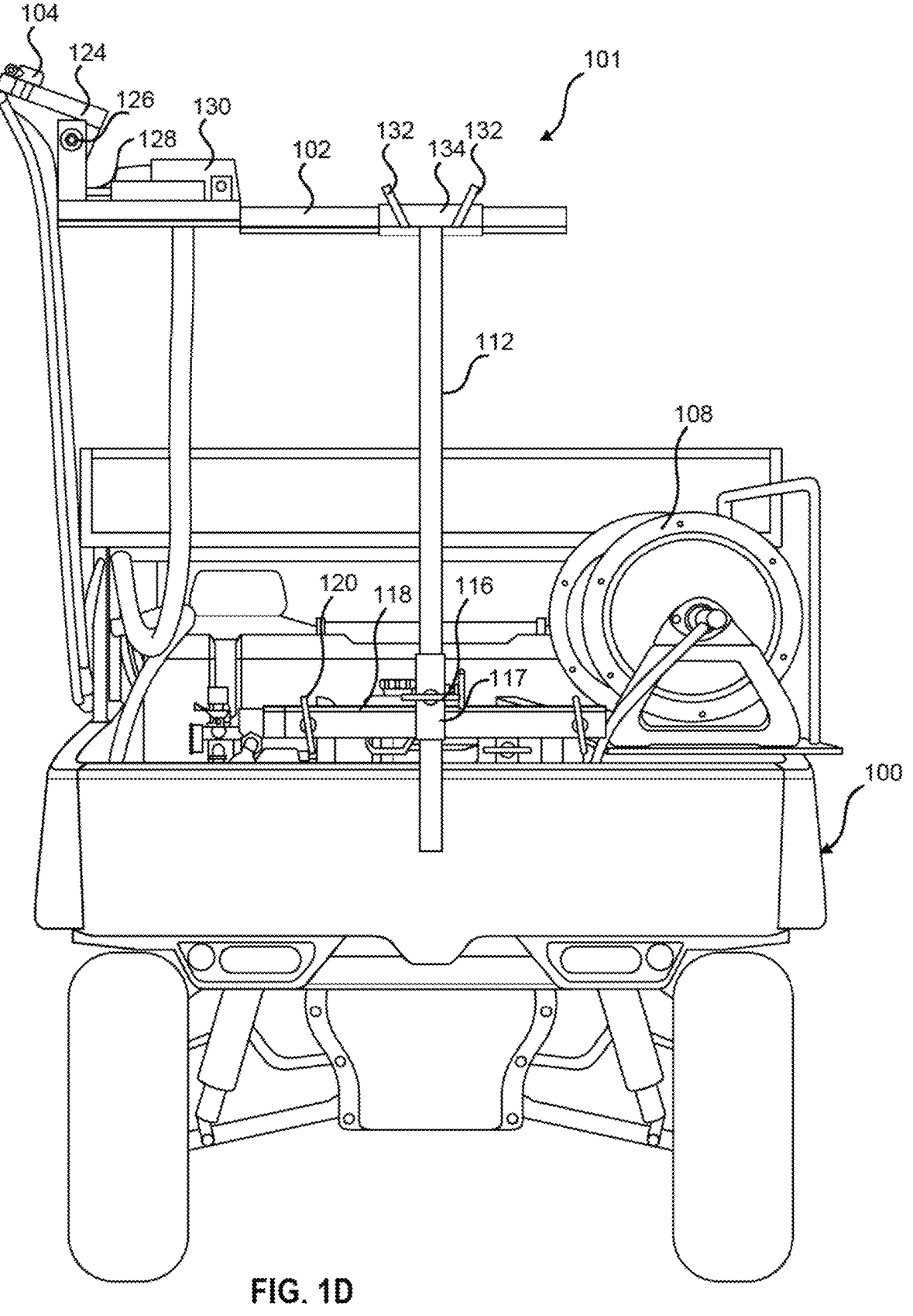

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure is generally directed to embodiments of a spray apparatus to connect or attach to a UTV, as well as embodiments to install and utilize the spray apparatus on the UTV. In an embodiment, the spray apparatus may include various components to enable installation into a UTV. For example, the spray apparatus may include connectors to attach or connect to a selected area of a UTV bed. The connectors may then connect or attach to various supports such that the supports may move in horizontal and vertical direction. The spray apparatus may also include one or more nozzles. The one or more nozzles may be attached or connected to the ends of one of the supports. The nozzles may further include actuators to adjust the nozzles in a plurality of direction, such as horizontally, vertically, and/or angularly. In an embodiment, one actuator may adjust the spray pattern of the nozzle. In yet another embodiment, actuators may be attached or connected to each of the supports and configured to move the supports in a vertical or horizontal direction.

The spray apparatus may also include a tank and corresponding connectors to enable attachment or connection to the bed of the UTV. The spray apparatus may also include a pump and/or manifold, based on how many nozzles are included. The spray apparatus may include also include a wand and nozzle combination, enabling a user to manually to apply herbicide to a selected area.

Additionally, the spray apparatus may include a controller, as well as one or more sensors or meters. For example, the tank may include a fill level sensor or meter. A flow meter may be positioned proximate the output of the pump, proximate the input of each nozzle, and/or at other varying locations. One or more sensors may determine vegetation height and density. The controller may also connect to or be in signal communication with each actuator to control nozzle and/or support position. Additionally, the controller may connect to or be in signal communication with a speedometer of the UTV. The controller may also connect to or be in signal communication with a user interface, the controller configured to display various aspects of the spray apparatus and/or alerts, as well as to display controls for manual operation of the spray apparatus.

Using the controller, the sensors, the meters, and/or other connections, the controller may determine when to adjust the nozzles and/or flow rate of herbicide for selected positions. For example, the controller may determine, based on a type and/or density of vegetation, a flow rate per UTV speed range or threshold. As the UTV traverses the right-of-way, the controller may continuously or substantially continuously determine whether the flow rate and/or speed moves outside of the flow rate per UTV speed range or threshold. If the range or threshold is exceeded, then the controller may adjust flow rate of the herbicide and/or prompt the UTV to decrease or increase in speed. The controller may also adjust spray pattern, flow rate, and/or nozzle position based on measured vegetation height and density.

The spray apparatus may be connected to the bed at such a position to ensure stability of the UTV and/or at such a position to prevent significant alteration to the center of balance of the UTV. Thus, the UTV can traverse steeper rights-of way without the potential for flipping or falling over.

Thus, the spray apparatus may be used to manage vegetation along a right-of-way for a variety and types of vegetation. Further, the spray apparatus may ensure that the UTV is balanced and stable. Further, the position of the spray apparatus may be such that the herbicide does not affect a user or driver of the UTV.

FIG. 1A, FIG. 1B, FIG. 1C, and FIG. 1D are diagrams illustrating a spray apparatus or assembly 101 (subsequently referred to as a spray assembly) connected or attached to a utility vehicle (UTV) 100, according to one or more embodiments of the disclosure. The spray assembly 101 may include, as illustrated, a tank 110. The tank 110 may be attached to the UTV 100 via sleeves or brackets 111. For example, the sleeves or brackets may include apertures. The apertures may enable pass through of fasteners. The fasteners may connect the sleeve or brackets to the bed of the UTV 100. The tank 110 may then fit into the sleeves or brackets. The sleeves or brackets may be comprised of metal or plastic. The tank 110 may further include a weight or ballast. For example, a solid base may be connected to the tank 110. Further, the tank 110 may be attached or connected to the UTV 100 at such a position to ensure that the UTV remains balanced and that the center of gravity does not change, particularly based on the addition of the other components of the spray assembly 101. The tank 110 may store or contain a herbicide. In another embodiment, the spray assembly 101 may comprise two or more tanks. Each of the tanks may store a herbicide selected for a particular portion of the right of way. For example, a first tank may include a first herbicide for a middle section of the right-of-way, while a second tank may include a second herbicide for an outer section of the right-of-way. Further, a third tank may include a third herbicide for spot-treatment via a wand and nozzle device of the spray assembly 101. In such embodiments, each tank may be a varying size. For example, the tank used for spot-treatment may be a smaller size than that of the other tanks.

As illustrated, the tank 110 may be in fluid communication with a pump and/or manifold 108. In such embodiments, the number of outlets and/or size of the manifold may be based on the number of hoses and nozzles in the spray assembly 101. For example, prior to installation, the number of hoses and nozzles may be specified based on a type of vegetation treatment desired (for example, a UTV to treat a plurality of sections of a right-of-way or a UTC to treat one selected section of the right-of-way). The manifold may be sized based on that number of hoses and nozzles.

The pump and/or manifold 108 may be in fluid communication with a number of hoses 119. The hoses 119 may be connected to nozzles (for example, nozzle 104 and nozzles 114) or nozzle assemblies. The nozzles may be configured or adjusted to provide a selected spray pattern (for example, spray pattern 122). Prior to or during operation, based on a number of factors (such as type and density of vegetation), the nozzle, via a user or a controller, may adjust the spray pattern. The hoses or one or more of the hoses may be wrapped around a spool 106. The spool 106 may be mounted to the bed of the UTV 100 or to a platform or support structure attached to the bed of the UTV 100. Such a platform or support structure may include one or more bars or tubes connected to one another to for a flat surface that the spool 106 may be mounted too. Each nozzle assembly may include, in embodiments, one, two, or more nozzles, in addition to other components, such as actuators (for example, actuator 130, among other components).

Each of the nozzles or nozzle assemblies may be mounted to one or more supports. In such embodiments, the nozzle or nozzle assembly may be mounted to the support such that the nozzle and/or nozzle assembly may slide along the support. Such a sliding operation may be performed by an actuator and/or manually by a user. Each support may be comprised of a bar or tube. Each bar or tube may be comprised of metal, wood, and/or a plastic or polymer. In an embodiment, each support may be comprised of a squared and hollow metal tube.

In an embodiment, the spray assembly 101 may include an end cap 121 or sleeve. The vertical support 112 may fit into the end cap 121 (or, in embodiments, and as described herein, may fit inside and move through a sleeve).

In an example, the spray assembly 101 may include a horizontal support 118. The horizontal support 118 may connect to a vertical support 112. In a further embodiment, another horizontal support 102 may connect to the vertical support. In such an example, the vertical support 112 may move in a vertical direction (in other words, up or down) in relation to the UTV 100 and the other supports 118, 102. Such movement is facilitated via a sleeve 117 and a screw 116. The vertical support 112 may fit in and slide through the sleeve 117. When the vertical support is at a desired position, then the screw 116 may be tightened, thus pushing against the vertical support 112 and locking the vertical support 112 into place. Similar sleeves (such as sleeve 134) may be positioned about the horizontal supports 118, 102 to allow each horizontal support to move in a horizontal direction. Such sleeves (for example, sleeve 134) may include similar screws 132. In an embodiment, the screws 116, 132 may include a handle enabling hand tightening.

One or more supports (such as a vertical or horizontal support) may be connected to the bed of the UTV 100. Such supports may be referred to as a base support. Such a connection may be a mechanical or adhesive attachment. For example, the base support may be welded to the bed of the UTV 100. In another embodiment, the base support may be fastened via fasteners (for example, screws or nuts and bolts) to the bed of the UTV 100. In another embodiment, the base support may be adhesively attached to the bed of the UTV 100.

In another example, each support may include a number of apertures positioned along one side of the support. In such an example, the sleeve may include a latch, such as a pull or push style latch. While positioning a support, a latch may, in one example, be pulled. When a desired position is reached, the latch may be released and may snap into the aperture of the support.

In yet another example, the movement of the supports may be automated. For example, an actuator may be connected to each support and may automatically move the bar in a desired direction. In another example, the supports may be pneumatic or hydraulic and may move in a direction based on a signal received from a controller.

The spray assembly 101 may include a controller (not illustrated) and/or one or more sensors or meters positioned throughout. The one or more sensors or meters may include a flow meter, a fluid level sensor or meter, an image sensor, and/or a sensor to indicate a position of a support. The controller may be in signal communication with each of the sensors or meters. The controller may also be in signal communication with a global positioning system (GPS), a speedometer of the UTV 100 and/or a user interface positioned within the cab of the UTV. In an embodiment, the user interface may include am interactive screen, a series of switches and lights (such as light emitting diodes (LEDs)), and/or a speaker.

Once a spray apparatus has been attached to or connected to the bed of the UTV 100, then the spray apparatus may be operated to apply herbicide to vegetation along a right-of-way. The controller may receive various measurements and/or factors from each of the one or more sensors or meters and/or other connections or data sources (such as the speedometer, a GPS, and/or each of the actuators). In an embodiment, the controller may receive, for example via the user interface, a type of vegetation and/or a slope of the surface at a selected portion of a right-of-way. The controller may determine a type of herbicide based on that information, as well as a flow rate of herbicide in relation to speed of the UTV 100 range and/or a spray pattern. Once a spraying operation has been initiated, the controller may begin monitoring the spray assembly 101, the location of the UTV 100, and/or the speed of the UTV 100. In embodiments, the UTV 100 may be operated by a user. As such, the user may operate the UTV 100 at varying speeds. The controller, in such embodiments, may determine a current flow rate in relation to current speed of the UTV 100. If that current flow rate in relation to the current speed of the UTV 100 falls outside of the flow rate of herbicide in relation to speed of the UTV 100 range, then the controller may adjust the flow rate of the herbicide and/or prompt a user to increase or decrease UTV 100 speed. In other embodiments, the UTV 100 may be an unmanned vehicle. In such examples, the controller may automatically adjust the speed of the UTV 100.

In another embodiment, the controller may connect to one or more image sensors. The image sensors may capture images of vegetation. The controller may utilize such images to determine a density and/or type of vegetation at the right-of-way in real-time. In such embodiments, the controller may determine an adjusted position for each of the nozzles. For example, for particularly dense vegetation, a nozzle may be lowered and/or the angle adjusted to concentrate the spray at the dense vegetation. In yet another embodiment, the controller may determine that the vegetation requires a spot-treatment, for example, based on density, height, and/or based on other environmental factors (such as slope of the right-of-way, an uneven surface, holes, and/or larger or more substantial vegetation, such as a tree or tree stump). If the controller determines that spot-treatment is required, then the controller may prompt the UTV to stop (such as automatically or via a prompt to a user). In such embodiments, the controller may set a vegetation density and/or height threshold.

Figure 2:
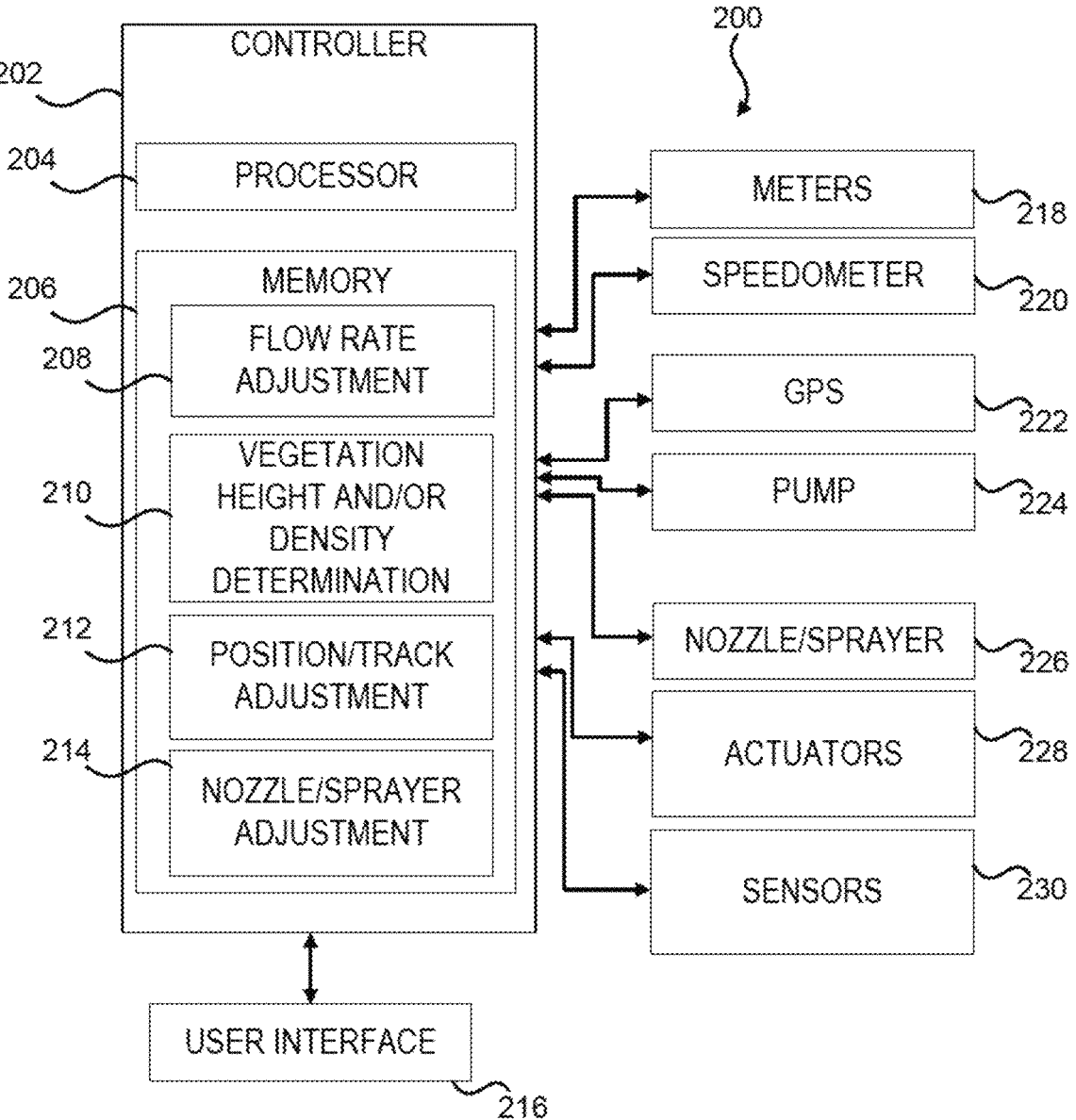
FIG. 2 is a simplified diagram illustrating a control system for a spray apparatus connected to a UTV, according to one or more embodiments of the disclosure.

FIG. 2 is a simplified diagram illustrating a control system for a spray apparatus or assembly connected to a UTV, according to one or more embodiments of the disclosure. A controller 202 may manage operation of the indicators and brakes, as well as other aspects, of the system 200. The controller 202 may be one or more controllers, a supervisory controller, programmable logic controller (PLC), a computing device (such as a laptop, desktop computing device, and/or a server), an edge server, a cloud based computing device, a user interface and/or computing device of the transportation vehicle, and/or other suitable devices. The controller 202 may be located in proximity to the spray assembly, within the cab of the UTV, and/or in the dashboard of the UTV 100. The controller 202, as noted, may be more than one controller. The controller 202 may include a processor 204, or one or more processors, and memory 206. The memory 206 may include instructions. In an example, the memory 206 may be a non-transitory machine-readable storage medium. As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 206 may store or include instructions executable by the processor 204. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication for remote monitoring and control/operation, as understood by those skilled in the art. For example, wireless communication may be Wi-Fi®, Bluetooth®, ZigBee, cellular wireless communication, satellite communication, or forms of near field communications. In addition, signal communication may include one or more intermediate controllers or relays disposed between elements that are in signal communication with one another.

The controller 202 may connect to various components of the system 200. For example, the controller may connect to one or more meters 218, a speedometer 220, a GPS 222, a pump 224, a nozzle/sprayer 226, one or more actuators 228, and/or one or more sensors 230. The controller 202 may receive data from the components and/or transmit instructions to the components (for example, to cause the component to perform some action).

As noted, the controller 202 may include instructions stored in the memory 206. The instructions may include flow rate adjustment instructions 208. Upon execution, the controller 202 may first determine a flow rate per UTV speed threshold. Such a threshold may be based on the density, height, and/or type of vegetation at the right-of-way. Once the threshold is determined and once a spraying operation has begun, the controller 202 may obtain a flow rate from one or more of the meters 218, a current speed of the UTV from the speedometer 220, and/or other data from the other components. Once the current flow rate and speed are determined, the controller may determine whether the current flow rate and speed are outside of the flow rate per speed UTV speed threshold. If the current flow rate and speed is outside of the flow rate per speed UTV speed threshold, then the controller may transmit a signal to the pump 224 indicative of a new flow rate that causes the spray assembly to operate within the threshold. In another embodiment, the controller 202 may adjust the speed of the UTV or indicate an adjusted speed to a user of the UTV, for example, via the user interface 216.

The instructions may include vegetation height and/or density determination instructions 210. When executed, controller 202 may obtain images and/or other data from the one or more sensors 230. Based on the images and/or other data, the controller 202 may determine the density and/or height of the vegetation at the right-of-way.

The instructions may include position and/or track adjustment instructions 212. Once a density and/or height of the vegetation at the right-of-way has been determined, the controller 202 may adjust the position and/or track of the supports of the spray assembly. For example, the controller 202 may transmit a signal to one or more of the actuators 228 that cause the supports to adjust to a selected position (for example, causing the nozzle or nozzle assembly, via adjustment of supports such as a vertical support and/or horizontal support, to be higher or lower and/or further to the left or right). For example, the nozzle may be lowered closer to the ground and then moved to the left to ensure complete coverage for particularly dense vegetation. In another embodiment, the track adjustment instructions 212 may, when executed, determine an adjustment or adjusted position for supports. Such a determination may be displayed, for example via a control board, UTV dashboard, or other display (for example, a user interface 216) to a user. In such embodiments, the user may then adjust the supports according to the adjustments or adjusted position indicated by the controller 202 and/or track adjustment instructions 212.

The instructions may include nozzle/sprayer adjustment instructions 214. Once a density and/or height of the vegetation at the right-of-way has been determined, the controller 202 may also adjust the nozzle/sprayer 226 of the spray assembly (for example, the angle and/or spray pattern of the nozzle/sprayer). The controller 202 may determine an adjusted position of the nozzle/sprayer 226 and then transmit a signal to the nozzle/sprayer 226 and/or actuators 228 to cause the nozzle/sprayer 226 to adjust to the adjusted position.

In another embodiment, the controller 202 may utilize the GPS 222 to determine various features of the right-of-way (for example, particularly dense vegetation based on previously known vegetation at a selected location) and/or speed of the UTV. Further, if the UTV is unmanned, the controller may be configured to cause the UTV to traverse the right-of-way based on GPS signals.

Figure 3A:
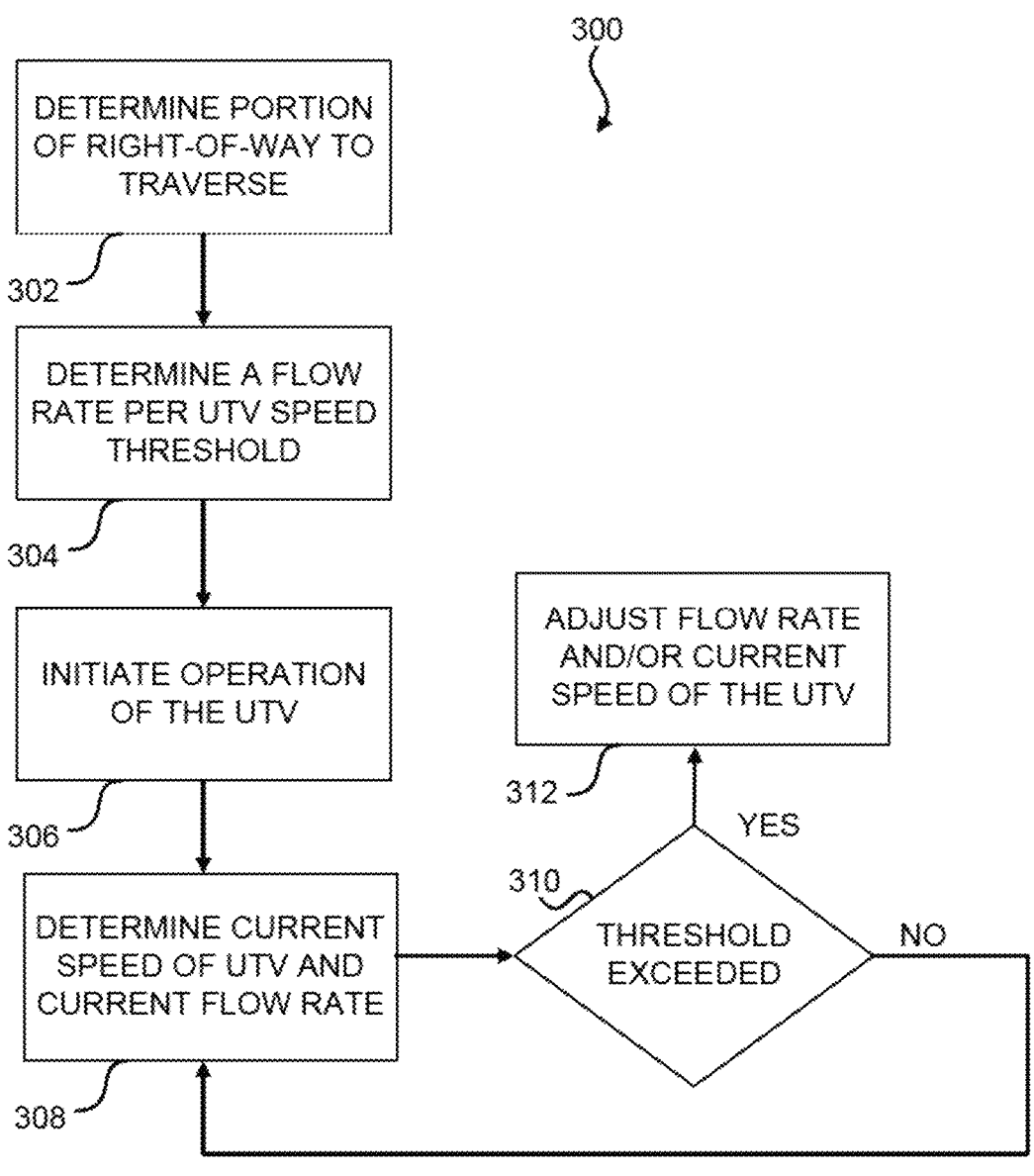
FIG. 3A and FIG. 3B are flow diagrams for managing a spray apparatus connected or attached to a UTV, according to one or more embodiments of the disclosure.
Figure 3B:
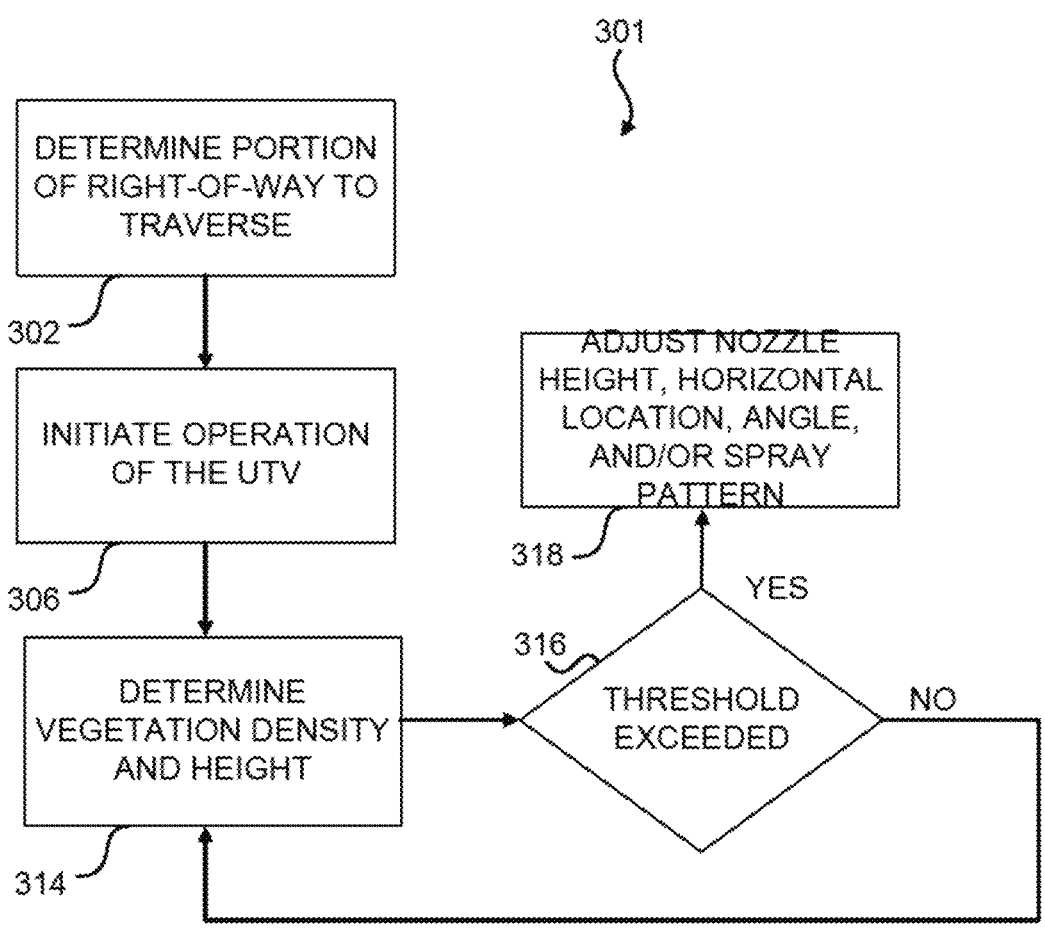

FIG. 3A and FIG. 3B are flow diagrams for managing a spray apparatus or assembly connected or attached to a UTV, according to one or more embodiments of the disclosure. Unless otherwise specified, the actions of method 300 and 301 may be completed within controller 202. Specifically, method 300 and 301 may be included in one or more programs, protocols, or instructions loaded into the memory 206 of the controller 202 and executed on the processor 204 or one or more processors of the controller 202. In other embodiments, method 300 and 301 may be implemented in or included in components of FIGS. 1A-2. The order in which the operations are described is not intended to be construed as a limitation, and any number of the described blocks may be combined in any order and/or in parallel to implement the methods.

At block 302, the controller 202 may determine a portion of a right-of-way to travers. Such a determination may be based on input from a user and/or based on a pre-selected schedule. At block 304, the controller 202 may determine the flow rate per the UTV speed threshold. Such a threshold may be based on type of vegetation at the right-of-way, density of vegetation at the right-of-way, height of vegetation at the right-of-way, the type of herbicide in the tank, and/or the spray angle and pattern of the nozzle.

At block 306, the controller 202 may initiate the operation of the UTV. The controller 202, in some embodiments, may directly control the UTV. In another embodiment, the initiation may include prompting for example via a user interface, a user to drive the UTV to the portion of the right-of-way.

At block 308, the controller 202 may determine the current speed of the UTV and the current flow rate of herbicide flowing through the nozzle. At block 310, the controller 202 may determine the current flow rate per UTV speed and compare that value to the flow rate per UTV speed threshold. If the current flow rate per UTV speed is outside of the flow rate per UTV speed threshold, then at block 312, the controller 202 may adjust the flow rate of herbicide and/or the current speed of the UTV. If the current flow rate per UTV speed is not outside of the flow rate per UTV speed threshold, then the controller 202 may continue to gather data and perform the same determinations for the spraying operation.

Turning to method 301, at block 302, the controller 202 may determine a portion of a right-of-way to travers. Such a determination may be based on input from a user and/or based on a pre-selected schedule. At block 306, the controller 202 may initiate the operation of the UTV. The controller

202, in some embodiments, may directly control the UTV. In another embodiment, the initiation may include prompting for example via a user interface, a user to drive the UTV to the portion of the right-of-way.

At block 314, the controller 202 may determine the vegetation density and height. The controller 202 may utilize images captured via image sensors to determine the vegetation density and height. In another embodiment, the controller 202 may use GPS signals and selected data (for example, from a database) regarding that particular location.

At block 316, the controller 202 may determine whether the density and/or height of the vegetation has exceeded a selected threshold for the current spray assembly settings including, for example, height, distance, angle, and/or herbicide. In an embodiment, as any of these settings are adjusted, then the controller 202 may adjust the selected threshold.

At block 318, if the selected threshold has been exceeded, then the controller 202 may determine adjustments to and then adjust the nozzle height, horizontal location, the angle, and/or the spray pattern of the spray assembly.

Figure 4:
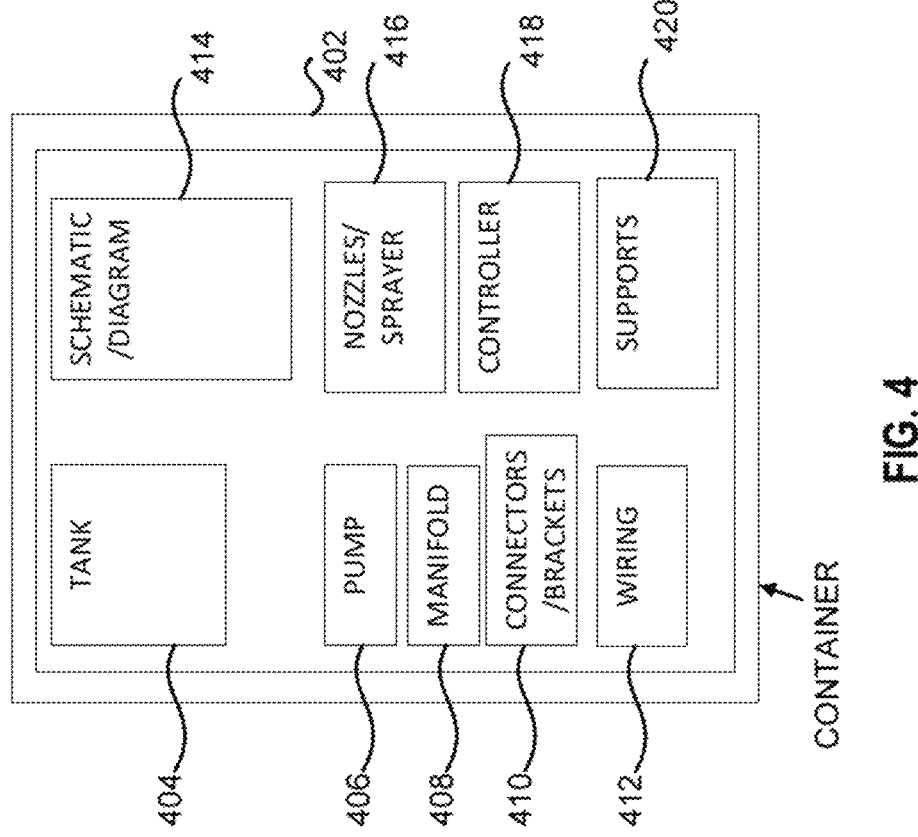
FIG. 4 is a simplified diagram illustrating a kit including the spray apparatus, according to one or more embodiments of the disclosure.

FIG. 4 is a simplified diagram illustrating a kit including the spray apparatus or assembly, according to one or more embodiments of the disclosure. The kit may include a number of components. The kit may include a container 402. The kit may include the tank 404 102 (including, in an embodiment, connectors, brackets, and/or sleeves for mounting to the bed of the UTC) positioned within the container. In an embodiment, the tank 404 may be separate from the kit illustrated in FIG. 4. The kit may also include a pump 406, a manifold 408, various connectors and/or brackets 410, wiring 412 (for example, for connecting various sensor and/or meters, as well as other components, to the controller 418), nozzles/sprayers 416, the controller 418, and/or a plurality of supports. The kit may include instructions, diagrams, schematics, a document including a link to a website, and/or other user documents 414 positioned within the container 402. Such documents may be in a hardcopy or paper format, and/or a digital format (e.g., DVD, USB key, or other similar media). Further, the schematics/diagrams 414 may indicate how the spray assembly is installed in the bed of the UTV.

This application is related to U.S. Provisional Application No. 63/656,396, filed Jun. 5, 2024, titled "APPARATUS, SYSTEMS, AND METHODS TO MANAGE VEGETATION ALONG A RIGHT-OF-WAY," the disclosure of which is incorporated herein by reference in their entireties.

In the drawings and specification, several embodiments of systems and methods to activate indicators have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. A method to control vegetation growth along a right-of-way via a vehicle, the method comprising:
    determining a portion of a right-of-way to traverse;
    determining a flow rate per vehicle speed threshold;
    initiating operation of the vehicle, the vehicle including a
        tank in fluid communication with a pump, the pump
        connected to a first end of a first hose and to cause treatment fluid to flow therethrough to an adjustable first nozzle connected to a second end of the first hose to thereby cause treatment fluid to be expelled from the first nozzle in one of a plurality of types of spray patterns, the first nozzle and at least a portion of the first hose supported by a vertically adjustable and horizontally adjustable support structure, the support structure including a nozzle connecter, a horizontal support, and a vertical support, the horizontal support connected to the vertical support such that the horizontal support moves horizontally in relation to the vertical support and the vertical support connected to a bed of the vehicle such that the vertical support moves vertically in relation to the bed of the vehicle;

during operation of the vehicle and as the vehicle traverses the portion of a right of way, determining a current speed of the vehicle and a current flow rate for an operating nozzle; and if the current speed of the vehicle and the current flow rate for the operating nozzle exceeds the flow rate per vehicle speed threshold:

adjusting one or more of (a) the flow rate of the operating nozzle or (b) the current speed of the vehicle.

2. The method of claim 1, further comprising if the current speed of the vehicle and the current flow rate for the operating nozzle exceeds the flow rate per vehicle speed threshold:

transmitting an alert to a cab section of the vehicle, the alert including the adjusted speed of the vehicle.

3. The method of claim 1, further comprising:

during operation of the vehicle, as the vehicle traverses the portion of the right of way and in conjunction with determination of the current speed of the vehicle and the current flow rate for an operating nozzle:

determining a density and height of vegetation for the portion of the right-of-way; and if one or more of the density or height exceeds a first selected threshold range:

adjusting one or more of (a) a height of the first nozzle in relation to the bed of the vehicle, (b) a horizontal location of the first nozzle in relation to the vertical support, (c) an angle of the first nozzle, or (d) a spray pattern of the first nozzle.

4. The method of claim 3, wherein determination of the density and height of vegetation for the portion of the right-of-way is based on one or more of visual inspection or data captured by one or more sensors.

5. The method of claim 1, further comprising:

during operation of the vehicle and as the vehicle traverses the portion of the right of way, determining a density and height of vegetation for the portion of the right-of-way; and if one or more of the density or height exceeds a first selected threshold range:

adjusting one or more of (a) a height of the first nozzle in relation to the bed of the vehicle, (b) a horizontal location of the first nozzle in relation to the vertical support, (c) an angle of the first nozzle, or (d) a spray pattern of the first nozzle.

6. The method of claim 5, further comprising pumping treatment fluid to an adjustable second nozzle and a second wand.

7. The method of claim 6, further comprising:

if one or more of the density or height exceeds a second selected threshold range and if a slope exceeds a vehicle slope threshold:

halting operation of the vehicle;

de-activating pumping through the first nozzle; and activating pumping through the second nozzle.

8. The method of claim 5, further comprising traversing the portion of the right of way based on signals received via a global positioning system GPS.

9. The method of claim 5, further comprising adjusting the one or more of (a) a height of the first nozzle in relation to the bed of the vehicle, (b) a horizontal location of the first nozzle in relation to the vertical support, (c) an angle of the first nozzle, or (d) a spray pattern of the first nozzle occurs automatically via one or more control devices.

10. The method of claim 5, wherein determining the density and height of vegetation for the portion of the right-of-way is based on retrieving pre-stored vegetation data from a remote database using GPS coordinates of the vehicle, rather than only on real-time sensor measurements.

11. An apparatus to attach to a vehicle to control vegetation along a right-of-way, the apparatus comprising:

a vertical support comprising a first end and a second end, the second end to connect to a bed of the vehicle so that the vertical support moves between a plurality of vertical positions in relation to the bed of the vehicle;

a horizontal support comprising a first end and a second end, the horizontal support to connect to the vertical support such that the horizontal support moves horizontally in relation to the vertical support;

a tank positionable within the bed;

a pump to fluidly connect to the tank;

a first hose comprising a first end and a second end, the first end of the first hose to connect to the pump, and partially positioned along the horizontal support;

a first nozzle to connect to the second end of the first hose and to one of the first end or the second end of the horizontal support such that, during a spraying operation, the first nozzle sprays treatment fluid one or more of behind the vehicle, to a side portion, or to a middle middle portion of the right-of-way; and a controller connected to the pump and the nozzle configured to one or more:

in response to a determination that one or more of a density and height of the vegetation exceeds a first threshold, determine an adjustment of one or more of the vertical support or horizontal support, or in response to a determination that a current speed of the vehicle and a current flow rate for the operating nozzle exceeds the flow rate per vehicle speed threshold, adjust one or more of (a) the flow rate of the operating nozzle or (b) the current speed of the vehicle.

12. The apparatus of claim 11, further comprising one or more sensors to measure the density and height of the right-of-way.

13. The apparatus of claim 11, wherein the controller further adjusts one or more of a spray angle or spray pattern based on one or more of (a) the determination that the density and height of the vegetation exceeds the first threshold or (b) the determination that the current speed of the vehicle and the current flow rate for the operating nozzle exceeds the flow rate per vehicle speed threshold.

14. The apparatus of claim 13, further comprising one or more of a rotary actuator or a linear actuator in signal communication with the controller and connected to the first nozzle, the controller configured to adjust one or more of the spray pattern of the first nozzle, an angular position of the first nozzle, or a linear position of the first nozzle via the one or more of the rotary actuator or the linear actuator.

15. The apparatus of claim 11, further comprising a flow rate meter in signal communication with the controller and positioned along the first hose and to measure the flow rate of treatment fluid flowing through the first hose.

16. The apparatus of claim 15, wherein the tank comprises a selected weight or ballast positioned at a selected location to provide improved balance.

17. The apparatus of claim 11 further comprising:

a vertical connector to connect to a bed of the vehicle;

a horizontal connector to connect to the first end of the vertical support;

a second hose (a) comprising a first end and a second end, (b) the first end of the second hose to connect to the pump;

a second nozzle to connect to the second end of the second hose and positioned on a wand to enable manual use for spot treatment of dense vegetation; and one or more sensors to measure vegetation density and height as the vehicle traverses the right-of-way; and wherein the controller is connected to the one or more sensors, the horizontal connector, and the vertical connector, and wherein the controller is further configured to:

in response to a determination that the density and height of the vegetation exceeds a first threshold and is less than a second threshold:

adjust one or more of the vertical support or horizontal support via the vertical connector or horizontal connector, respectively;

in response to a determination that the density and height of the vegetation exceeds the second threshold:

direct flow of treatment fluid from the first nozzle to the second nozzle.

18. An unmanned vehicle comprising:

the apparatus of claim 11; and the controller of claim 11 configured to:

(i) receive GPS waypoints defining a right-of-way path;

(ii) direct the unmanned vehicle relative to the right-of-way path without human intervention; and (iii) adjust flow rate and nozzle position in real-time.

19. The unmanned vehicle of claim 18, wherein the controller is configured to perform the method of claim 1.

20. A kit to provide a spray assembly for a vehicle to control vegetation along a right-of-way, the kit comprising:

a container;

a first connector positioned in the container and configured to connect to a bed of the vehicle;

a vertical support bar positioned in the container, comprising a first end and a second end, and configured to connect to the first connector such that the vertical support bar moves vertically in relation to the bed of the vehicle;

a second connector positioned in the container and configured to connect to the first end of the vertical support bar;

a horizontal support bar positioned in the container, comprising a first end and a second end, and configured to connect to the second connector such that the horizontal support bar moves horizontally in relation to the vertical support bar;

a tank positioned in the container and configured to connect to the bed of the vehicle;

a pump positioned in the container and configured to fluidly connect to the tank;

a hose positioned in the container, comprising a first end and a second end, the first end of the hose to connect to the pump, and positionable along the horizontal support bar; and a nozzle positioned in the container and configured to connect to the second end of the hose and to one of the first end or the second end of the horizontal support such that, during a spraying operation, the nozzle sprays treatment fluid behind the vehicle.

* * * * *